(12) United States Patent
Morris et al.

(10) Patent No.: US 7,293,032 B1
(45) Date of Patent: Nov. 6, 2007

(54) COMPRESSING DECIMAL TYPES

(75) Inventors: J. Mark Morris, Poway, CA (US); Todd A. Walter, Poway, CA (US)

(73) Assignee: NCR Corp., Dayton, OH (US)

( * ) Notice: Subject to any disclaimer, the term of this patent is extended or adjusted under 35 U.S.C. 154(b) by 193 days.

(21) Appl. No.: 10/316,289

(22) Filed: Dec. 11, 2002

(51) Int. Cl.
*G06F 17/30* (2006.01)

(52) U.S. Cl. .......................................... 707/101; 707/1

(58) Field of Classification Search .............. 707/1–10, 707/100, 101, 200
See application file for complete search history.

(56) References Cited

U.S. PATENT DOCUMENTS 5,953,723 A * 9/1999 Linoff et al. .................... 707/4
6,493,728 B1 * 12/2002 Berger ........................ 707/202

* cited by examiner

*Primary Examiner*—Don Wong
*Assistant Examiner*—Marcin Filipczyk
(74) *Attorney, Agent, or Firm*—Howard Speight (57) ABSTRACT

A method, computer program, database system and data structure are disclosed for compressing a decimal type field in a database including one or more tables. Each of the one or more tables includes one or more rows. Each of the one or more rows includes an instance of the decimal type field. Space is allocated in one of P amounts to an instance of the decimal type field in a row, the amount being chosen based on the size of the value being stored in the instance of the decimal type field. One or more presence bits are set in the row to identify the amount of space allocated.

22 Claims, 6 Drawing Sheets

COMPRESSING DECIMAL TYPES

BACKGROUND

Database systems typically include tables, each of which includes a set of rows, which are frequently divided into fields (or columns). The fields are generally typed, for example as binary, integer, floating point, decimal, or as one of a variety of other types. Decimal fields hold decimal values (e.g., "10.485"). In many systems, the field width necessary for decimal values varies depending on the number of digits in the decimal value. Typically, the field width allocated for a particular decimal column in each row is decided when a database is designed and is set to the maximum field width expected for that column. Making efficient use of storage of tables which include decimal columns is a challenge.

SUMMARY

In general, in one aspect, the invention features a method for compressing a decimal type field in a database including one or more tables. Each of the one or more tables includes one or more rows. Each of the one or more rows includes an instance of the decimal type field. The method includes allocating space in one of P amounts to an instance of the decimal type field in a row, the amount being chosen based on the size of the value being stored in the instance of the decimal type field, and setting one or more presence bits in the row to identify the amount of space allocated.

Implementations of the invention may include one or more of the following. Each of the one or more rows may include a row header. Setting the one or more presence bits may include setting the one or more presence bits in the row header of the row to identify the amount of space allocated. Allocating space may further include allocating space in a second of the P amounts to a second instance of the decimal type field in a second row, the second amount being chosen based on the size of the value being stored in the second instance of the decimal type field, and setting one or more presence bits in the second row to identify the second amount of space allocated. Allocating space may include allocating a number of bytes, the maximum number that could be allocated being Q, a power of two. Setting the one or more presence bits may include setting $\log_2(Q)$ presence bits. Allocating space may include allocating a number of bytes, the number being a power of two. The method may further include allocating the Pmax−Palloc space in the row to another use, where Pmax is the maximum amount of space that can be allocated to an instance of the decimal type field and Palloc is the amount of space actually allocated. The method may further include storing the value in the allocated space. The method may further include storing the value in less than all of the allocated space.

A row storage space may be allocated to the row. The row may include data. The method may further include determining that the amount of space allocated to the instance of the decimal type field in the row is insufficient because of a new value to be stored in the instance of the decimal type field in the row, allocating a new row storage space for the row, where the new row storage space includes space in one of the P amounts sufficient to hold the new value, storing data from the row and the new value in the new row storage space, setting one or more presence bits in the new row to identify the amount of space allocated for the decimal type field, and releasing the row storage space for other uses.

In general, in another aspect, the invention features a computer program, stored on a tangible storage medium, for use in compressing a decimal type field in a database including one or more tables. Each of the one or more tables includes one or more rows and each of the one or more rows includes an instance of the decimal type field. The program includes executable instructions that cause a computer to allocate space in one of P amounts to an instance of the decimal type field in a row, the amount being chosen based on the size of the value being stored in the instance of the decimal type field, and to set one or more presence bits in the row to identify the amount of space allocated.

In general, in another aspect, the invention features a database system including a massively parallel processing system including one or more nodes, a plurality of CPUs, each of the one or more nodes providing access to one or more CPUs, a plurality of data storage facilities, each of the one or more CPUs providing access to one or more data storage facilities, one or more tables, each of the one or more tables being stored on one or more of the data storage facilities, each of the one or more tables including one or more rows, and each of the one or more rows including an instance of a decimal type field. The database system includes a process for compressing the decimal type field, the process including allocating space in one of P amounts to an instance of the decimal type field in a row, the amount being chosen based on the size of the value being stored in the instance of the decimal type field, and setting one or more presence bits in the row to identify the amount of space allocated.

In general, in another aspect, the invention features a memory for storing data for access by a database system being executed on a data processing system. The memory includes a data structure stored in said memory. The data structure includes information resident in a row in a table of the database system including a variable decimal field having a size and one or more variable decimal presence bits, whose aggregate value determines the size of the variable decimal field.

DETAILED DESCRIPTION

Figure 1:
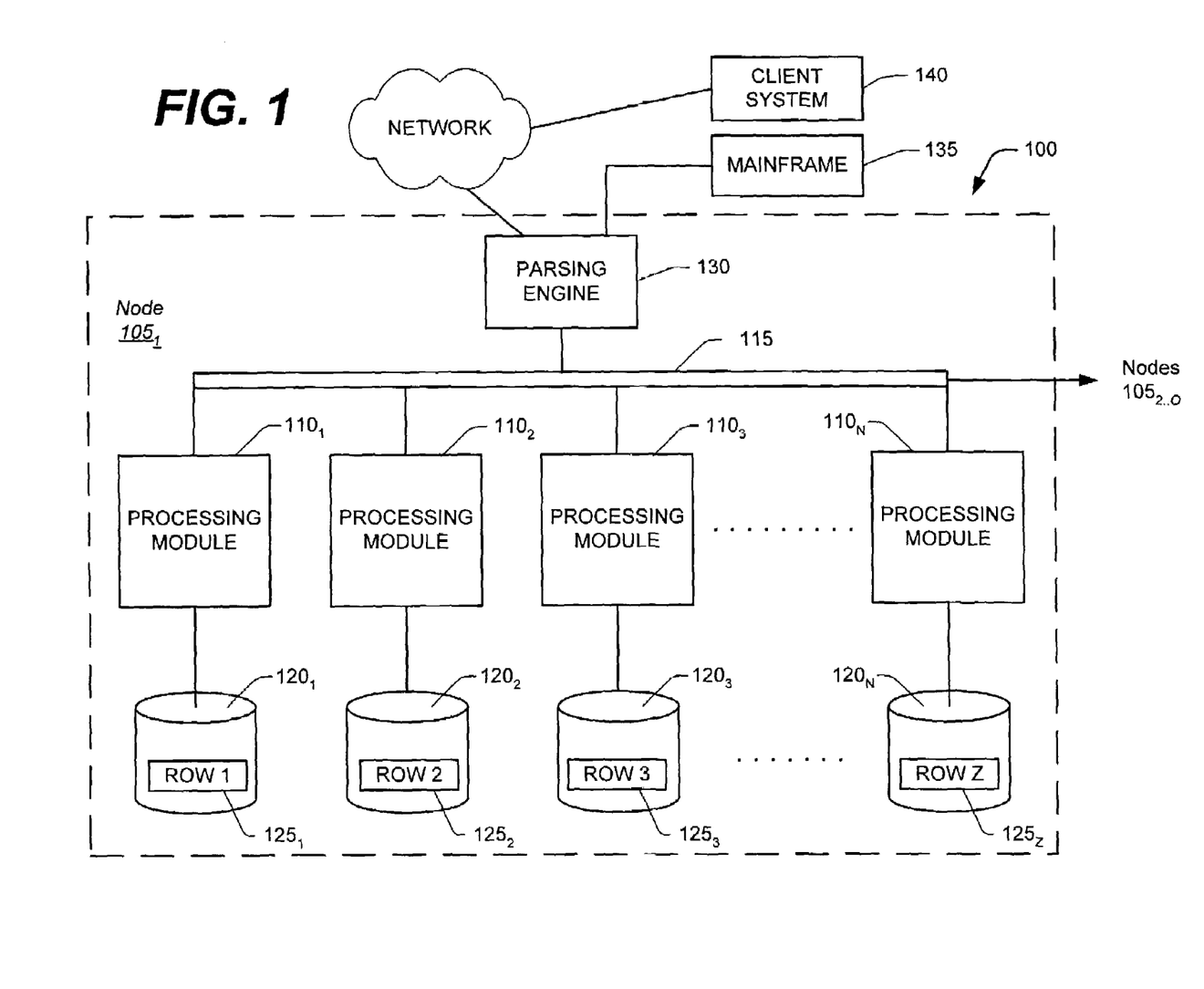
FIG. 1 is a block diagram of a node of a database system.

The decimal type compression technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...O}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
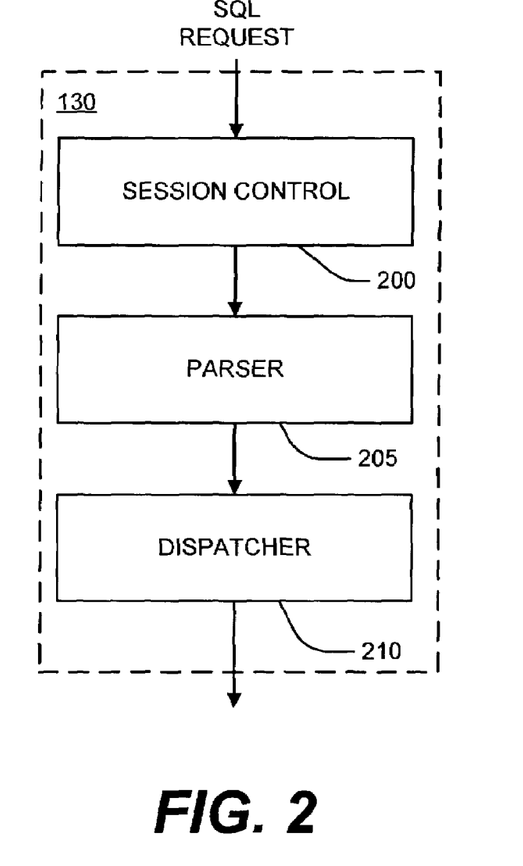
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
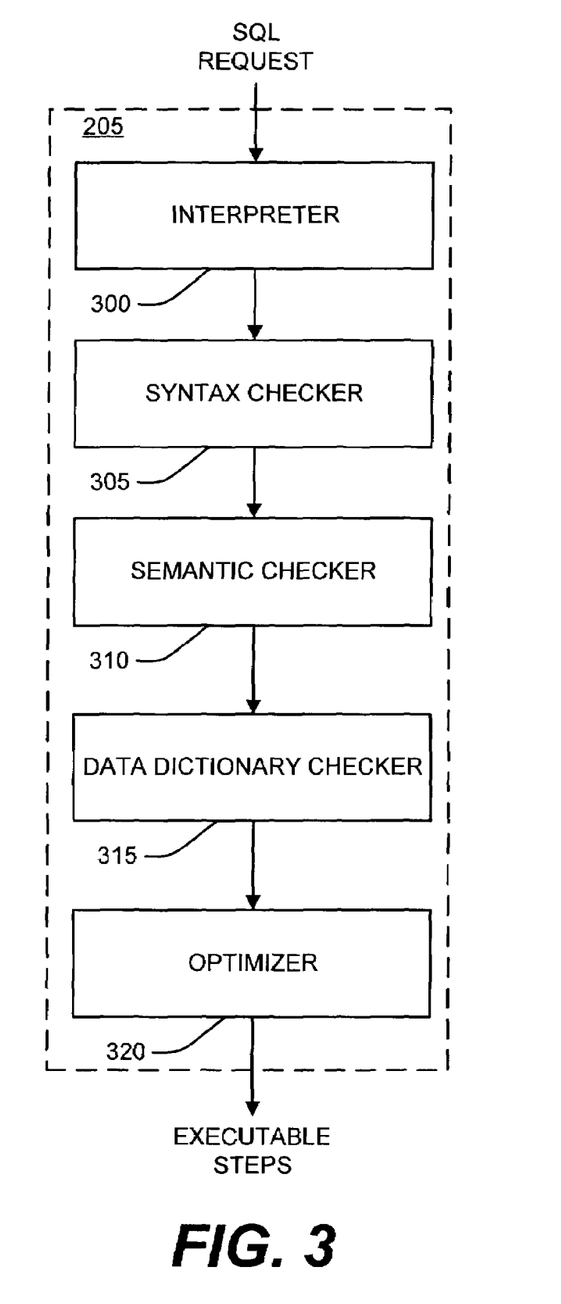
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Many database systems choose a uniform field width for decimal type fields (or columns) based on the total number of digits of the decimal as determined when the field is defined during the database design process. A database designer chooses a field definition sized to hold the largest possible decimal value in the domain of the field. This can result in inefficient usage of physical storage when a decimal field value could be expressed in a smaller storage format. The list below shows an example mapping of decimal specification to physical storage size:

| Field Specification | Physical storage allocated |
| --- | --- |
| Decimal 1-2 digits: | 1 byte |
| Decimal 3-4 digits | 2 bytes |
| Decimal 5-9 digits | 4 bytes |
| Decimal 10-18 digits | 8 bytes |

Figure 4:
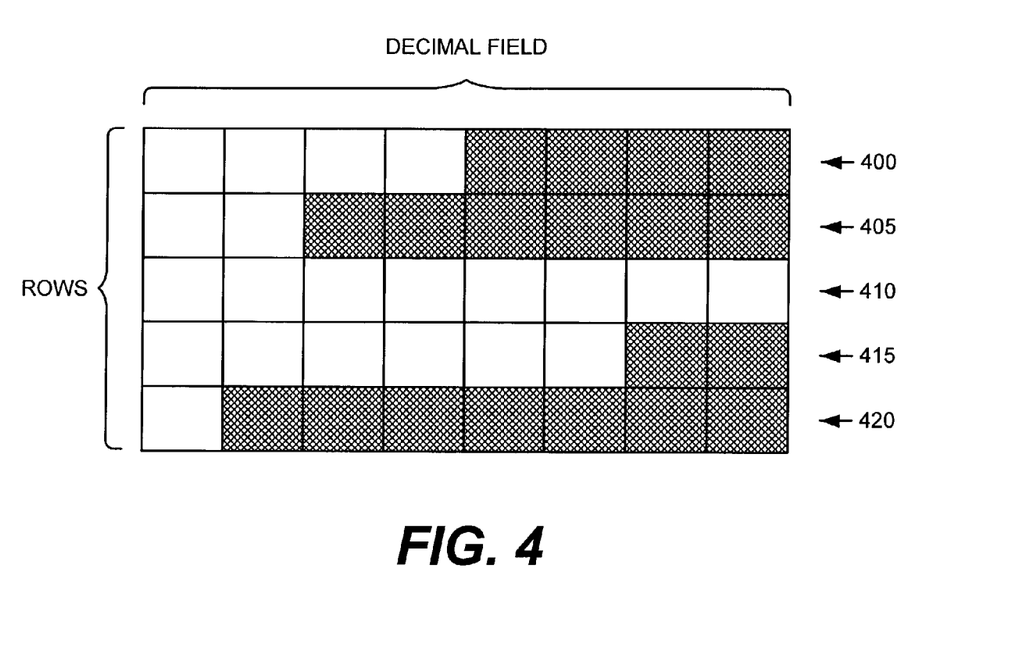
FIG. 4 is a representation of a field in a group of rows.

In this example, when a field in a table is specified to hold 10-18 digits, 8 bytes are allocated to that field in each row of the table. The inefficiency occurs when a value having less than 10 digits is stored in the field, as illustrated in FIG. 4, which shows a single decimal field from a representative group of rows in a table. The field includes eight bytes shown by the divisions in the rows. A first field 400 uses only four of the eight bytes allocated to the field. The other four bytes, indicated by cross-hatching, are not used and are representative of the inefficiencies associated with decimal values. A second field 405 uses only two of the eight bytes allocated to the field and does not use the other six. A third field 410 uses all eight bytes, resulting in no inefficiency. A fourth field 415 and a fifth field 420 use six bytes and one byte, respectively, and do not use two bytes and seven bytes, respectively.

Figure 5:
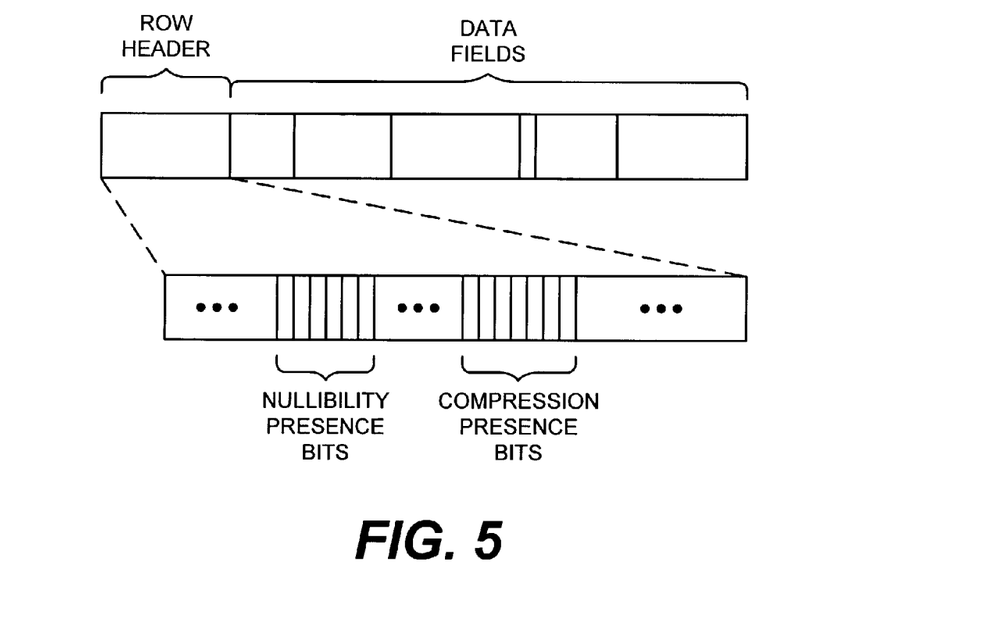
FIG. 5 is a representation of a row in a table in a database system.

The system described herein addresses this inefficiency by allocating storage for decimal fields that more closely matches the amount of storage actually needed. The system manages the variable storage through the use of "presence bits," which are typically included in a row's header, as shown in FIG. 5. A row typically includes a row header and one or more data fields. In some existing systems, the row header includes presence bits, which describe characteristics of some of the fields in the row. For example, the row header may include "nullability" presence bits, each of which is correlated to a field in the row and indicates whether that field is nullable. Similarly, the row header may include "compression" presence bits, each of which is correlated to a field in the row and indicates whether that field is compressed using a compression algorithm.

Figure 6:
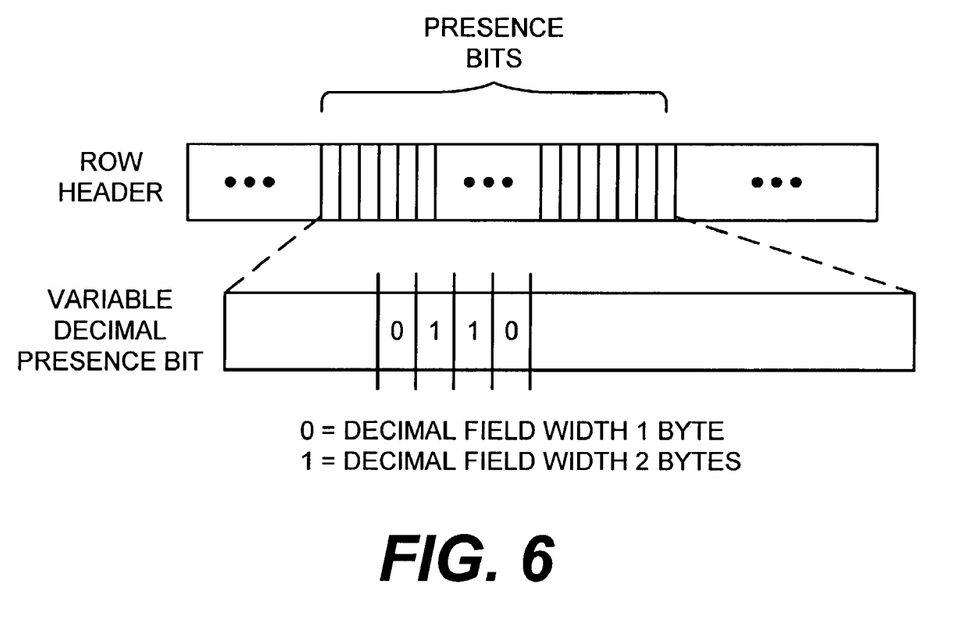
FIGS. 6 and 8 are representations of variable decimal presence bits in a row header.

"Variable decimal" presence bits, illustrated in FIG. 6, are assigned to the decimal fields in the row, and are coded to indicate the amount of storage allocated to the variable decimal fields in this particular row. The variable decimal presence bits may be different in each of the rows of the table, which means that the amount of storage allocated to a particular variable decimal field can vary from row to row, depending on the size of the decimal value to be stored in each row.

The invention utilizes a presence bit field in the row header of each row to determine the physical field length for each variable decimal field in that row. In one example system, the presence bit field length is the same for all rows in the table. The binary value of the presence bit field specifies a mapping to the number of bytes used for storage of the variable decimal field.

Depending on the embodiment, the presence bit field length may vary. Example embodiments are shown below.

A presence bit field with a length of one bit, illustrated in FIG. 6, associates one variable decimal presence bit with each variable decimal field in the row. The example shown in FIG. 6 includes four variable decimal presence bits, which means that the row includes four variable decimal fields. In the example shown in FIG. 6, a "0" in a variable decimal presence bit indicates that the decimal field associated with that bit is one byte in length. A "1" in a variable decimal presence bit indicates that the decimal field associated with that bit is two bytes in length.

Figure 7:
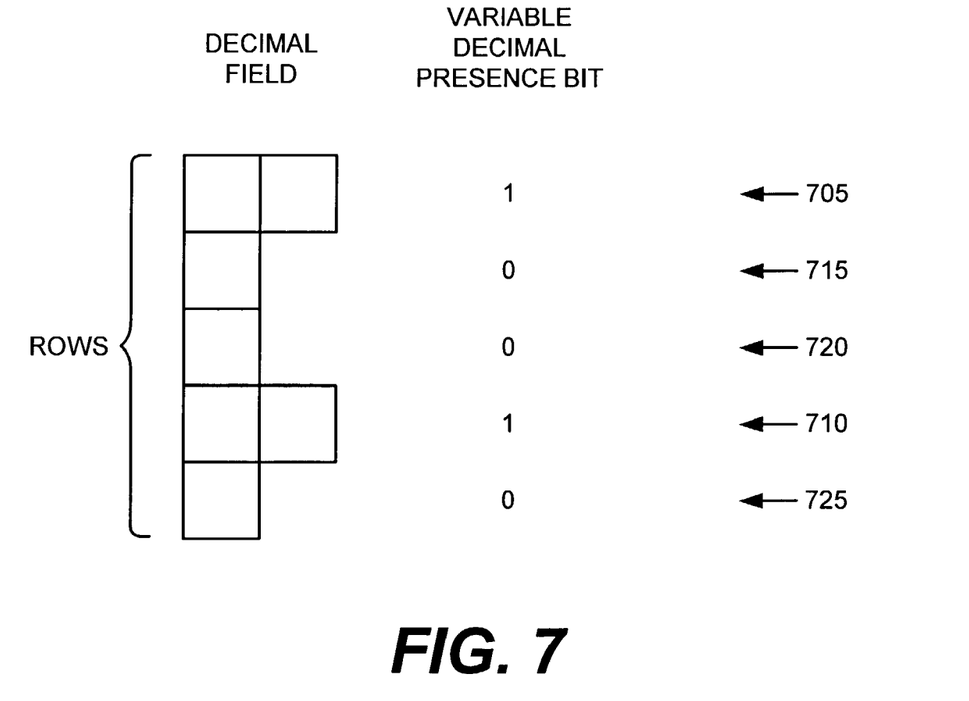
FIGS. 7 and 9 are representations of the storage allocated to a decimal field when variable decimal presence bits are used.

The length of a variable length decimal fields can vary from row to row, as shown in FIG. 7, which shows five instances of a single variable decimal field. The decimal fields in rows 705 and 710, for which the variable decimal presence bits are "1," are two bytes long. The decimal fields in rows 715, 720 and 725, for which the variable decimal presence bits are "0," are one byte long. In this example, implementation of the method for compressing a decimal type field saves three bytes of storage less the size of the variable presence decimal bits.

Figure 8:
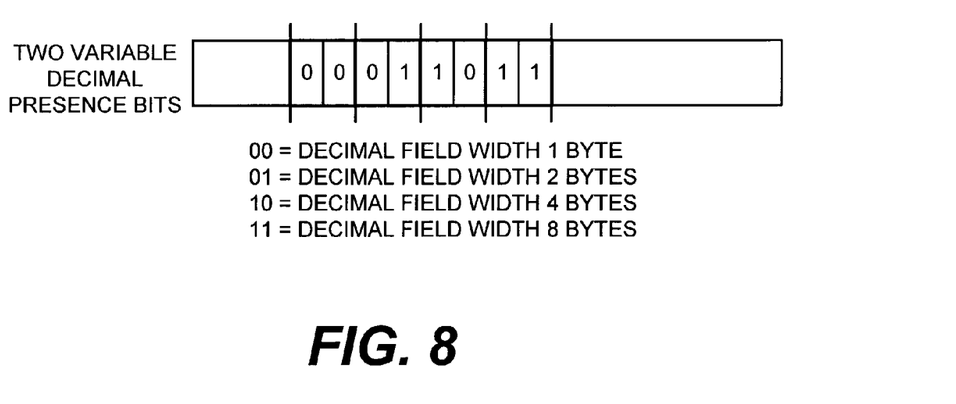

A system with two variable decimal presence bits, shown in FIG. 8, provides additional flexibility in the allocation of memory to variable decimal fields. In the example shown in FIG. 8, the system can allocate a maximum of eight bytes to each of four variable decimal fields in each row. The system can allocate smaller amounts of storage to a variable decimal field by setting the associated variable decimal presence bits as follows: "00" allocates 1 byte; "01" allocates two bytes; "10" allocates 4 bytes; and "11" allocates 8 bytes. In this example and the example shown in FIGS. 6 and 7, the allocation is performed according to the following equation:

$$\text{Bytes allocated} = 2^{\text{binary value of variable decimal presence bits}} \quad (1)$$

Figure 9:
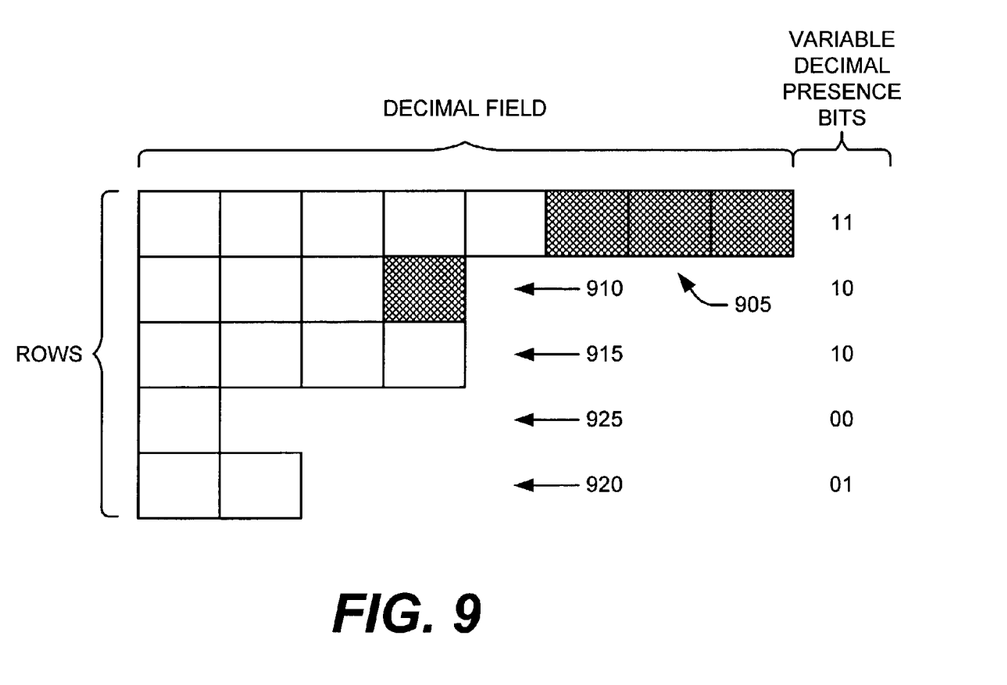

As before, the length of variable length decimal fields can vary from row to row, as shown in FIG. 9, which shows five instances of a single variable decimal field. The decimal field in row 905, for which the variable decimal presence bits are "11," is eight bytes long. The decimal fields in rows 910 and 915, for which the variable decimal presence bits are "10," are four bytes long. The decimal field in row 920, for which the variable decimal presence bits are "01," is two bytes long. The decimal field in row 925, for which the variable decimal presence bits are "00," is one byte long. In this example, implementation of the method for compressing a decimal type field saves 21 bytes of storage less the size of the variable decimal presence bits.

While FIGS. 6 and 8 each show a row with more than one variable decimal field and more than one presence bit field, all of the presence bit fields are shown having the same size. While this is possible, the presence bit fields for different variable decimal fields in a row are not required to be the same size. In general, the number of bits in each of the presence bit fields in a row is independent of the number of bits in the other presence bit fields in the row. For example, one presence bit field in a row may be one bit long while another presence bit field in the same row is two bits long.

In contrast, the presence bit field associated with a particular variable decimal field is the same size for every row. Thus, if a presence bit field for a particular variable decimal field is D bits long in one row (where D is a constant), it will be D bits long for all rows.

The example in FIG. 9 shows that additional storage savings are still available with increased granularity in the size of the variable decimal field. For example, the variable decimal field in row 905 includes three unused bytes, represented by cross-hatching, that could be eliminated if an additional variable decimal presence bit were added for each row. Similarly, row 910 has a single unused byte that could be eliminated. The number of variable decimal presence bits per variable decimal field is a design variable that can be adjusted during the design of a particular database system.

Changing the value stored in a variable decimal field in a row may require reevaluation of the amount of storage allocated to that variable decimal field in that row. If the system determines that the storage required for the new value to be stored in the variable decimal field of a row exceeds the amount of storage that was previously allocated, the system will duplicate the row in a new location with increased storage for the variable decimal field. The system will free the storage previously used by the row for other uses.

If the system determines that the storage required for the new value to be stored in the variable decimal field of a row is less than the amount of storage that was previously allocated, the system has two choices. It can simply store the new value in the storage area already allocated and accept the resulting inefficiency. Alternatively, the system can duplicate the row in a new location with reduced storage for the variable decimal field.

Figure 10:
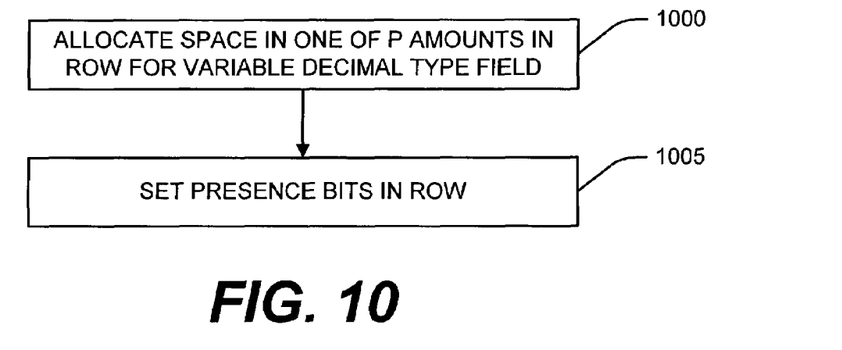
FIGS. 10 and 11 are flow charts.

In use, as shown in FIG. 10, the system allocates space in one of P amounts to an instance of a variable decimal type field in a row (block 1000). The amount chosen is based on the size of the value. The system sets one or more presence bits in the row to identify the amount of space allocated (block 1005).

Figure 11:
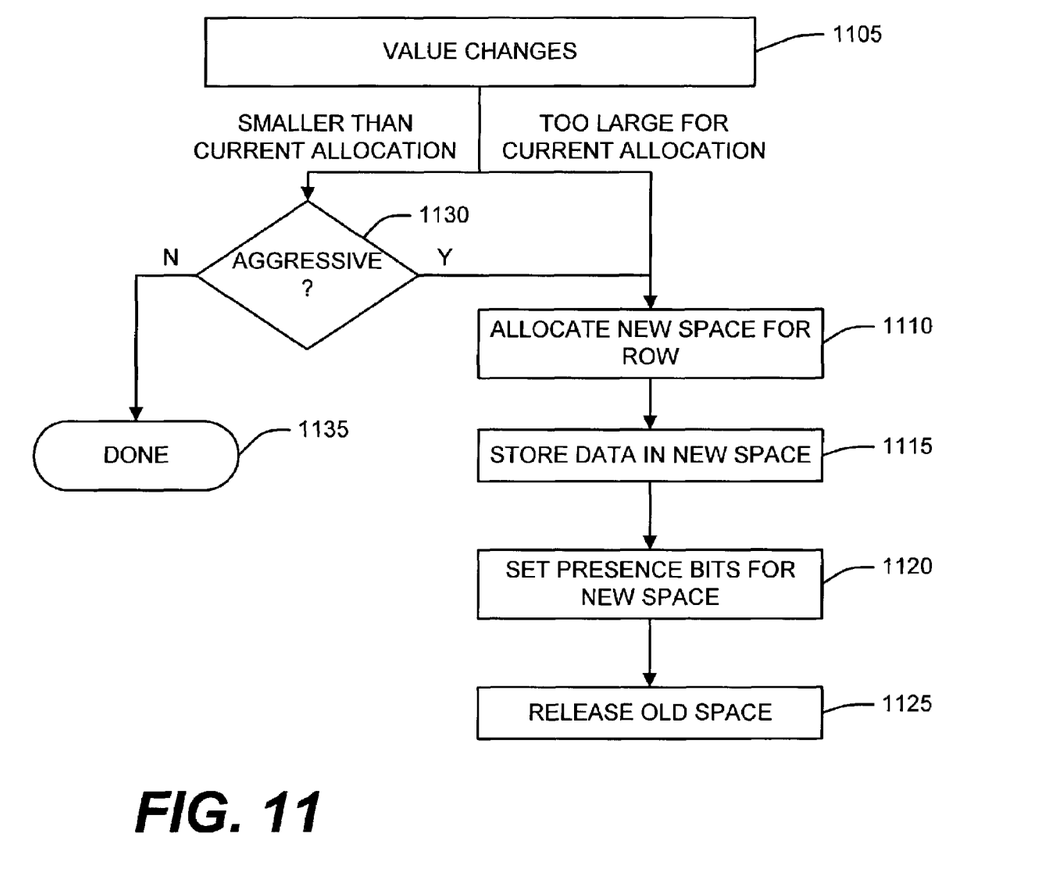

If the size of the value to be stored in the instance of the variable decimal type field changes (block 1105), as shown in FIG. 11, so that the size of the value to be stored is larger than the amount of space allocated, the system allocates a new storage space for the row (block 1110) such that the new storage space includes enough space to hold the new value. The system then stores data from the old location, and the new value, in the new storage location (block 1115). The system sets one or more presence bits in the new row, as described above (block 1120), and releases the old space for other uses (block 1125).

If the size of the value to be stored in the instance of the variable decimal type field changes (block 1105) so that the size of the value to be stored is smaller than the amount of space allocated, the system can take one of two approaches. If the system is managing memory aggressively (block 1130), it will assign the row to a new location (described above). Otherwise, the system will not change the space allocation (block 1115).

It will be understood that the above examples are not limiting. For example, any number of variable presence bits could be used and the maximum size of the variable decimal fields could be 16 bytes, 32 bytes or more. Further, the relationship between the number of bytes allocated to a variable decimal field and the values of the variable decimal presence bits may be other than that shown in equation (1). For example, the relationship may be linear, as shown below (C is a constant):

$$\text{Bytes allocated} = C * \text{value of variable decimal presence bits} \quad (2)$$

The net savings in physical capacity is computed as follows:

Let R be the total number of rows in the table.
Let DMAX be the number of digits required to specify the largest decimal value in a field.
Let DROW be the number of digits required to specify the decimal value in a field.

Let B(D) be a function to determine the number of bytes required to specify a decimal with D digits.
Let P(DMAX) be a function to determine the number of presence bits required to specify a decimal domain with DMAX as the largest decimal value.
Let * represent the multiplication operator.
Then $$SFIXED\_DECIMAL = R * B(DMAX) \quad (3)$$

$$SVARDECIMAL = (R * P(DMAX))/8 + \Sigma(B(DROW)) \quad (4)$$

The net savings in physical storage bytes is computed as $$NET\ SAVINGS = SFIXED\_DECIMAL - SVARDECIMAL \quad (5)$$

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for compressing a decimal type field in a database including one or more tables, each of the one or more tables including a plurality of rows, each of the plurality of rows including an instance of the decimal type field, the method comprising
for each of the plurality of rows:
allocating space in one of P amounts to an instance of the decimal type field in a row, the amount being chosen based on a size of a value being stored in the instance of the decimal type field, where the amount of allocated space is different for one or more of the plurality of rows than it is for one or more others of the plurality of rows, and where P is a predetermined positive integer greater than 1 representing the number of allocated space amounts allowed to be allocated for each row;
setting one or more presence bits in the row to identify the amount of space allocated; and
storing the value in the space allocated for the instance of the decimal type field in the row.

2. The method of claim 1 wherein each of the one or more rows includes a row header and setting the one or more presence bits comprises
setting the one or more presence bits in the row header of the row to identify the amount of space allocated.

3. The method of claim 1 wherein allocating space further comprises
allocating space in a second of the P amounts to a second instance of the decimal type field in a second row, the second amount being chosen based on a size of a value being stored in the second instance of the decimal type field; and
setting one or more presence bits in the second row to identify the second amount of space allocated.

4. The method of claim 1 wherein
allocating space comprises allocating a number of bytes, the maximum number that could be allocated being Q, where Q is a positive multiple of two; and
setting the one or more presence bits comprises setting $\log_2(Q)$ presence bits.

5. The method of claim 4 wherein
allocating space comprises allocating a number of bytes, the number being a power of two.

6. The method of claim 1 further comprising
allocating a Pmax–Palloc space in the row to another use, where Pmax is the maximum amount of space that can be allocated to an instance of the decimal type field and Palloc is the amount of space actually allocated.

7. The method of claim 1 further comprising
storing the value in less than all of the space allocated for the instance of the decimal type field in the row.

8. The method of claim 1, wherein a row storage space is allocated to the row and the row includes data, the method further comprising:
determining that the amount of space allocated to the instance of the decimal type field in the row is insufficient because of a new value to be stored in the instance of the decimal type field in the row;
allocating a new row storage space for the row, where the new row storage space includes space in one of the P amounts sufficient to hold the new value;
storing data from the row and the new value in the new row storage space;
setting one or more presence bits in the new row to identify the amount of space allocated for the decimal type field; and
releasing the row storage space for other uses.

9. A computer program, stored on a tangible storage medium, for use in compressing a decimal type field in a database including one or more tables, each of the one or more tables including a plurality of rows, each of the plurality of rows including an instance of the decimal type field, the program including executable instructions that cause a computer to:
for each of the plurality of rows:
execute a step to allocate space in one of P amounts to an instance of the decimal type field in a row, the amount being chosen based on the size of a value being stored in the instance of the decimal type field, where the amount of allocated space is different for one or more of the plurality of rows than it is for one or more others of the plurality of rows, and where P is a predetermined positive integer greater than 1 representing the number of allocated space amounts allowed to be allocated for each row;
set one or more presence bits in the row to identify the amount of space allocated; and
store the value in the space allocated for the instance of the decimal type field in the row.

10. The computer program of claim 9 wherein each of the one or more rows includes a row header and the executable instructions include instructions that cause the computer, when setting the one or more presence bits, to:
set the one or more presence bits in the row header of the row to identify the amount of space allocated.

11. The computer program of claim 9 wherein the executable instructions include instructions that cause the computer, when allocating space to:
allocate space in a second of the P amounts to a second instance of the decimal type field in a second row, the second amount being chosen based on a size of a value being stored in the second instance of the decimal type field; and set one or more presence bits in the second row to identify the second amount of space allocated.

12. The computer program of claim 9 wherein the executable instructions include instructions that cause the computer when allocating space, to allocate a number of bytes, the maximum number that could be allocated being Q, where Q is a positive multiple of two; and when setting the one or more presence bits, to set $\log_2(Q)$ presence bits.

13. The computer program of claim 12 wherein the executable instructions include instructions that cause the computer, when allocating space, to allocate a number of bytes, the number being a power of two.

14. The computer program of claim 9 wherein the executable instructions further comprise instructions that cause the computer to allocate a Pmax−Palloc space in the row to another use, where Pmax is the maximum amount of space that can be allocated to an instance of the decimal type field and Palloc is the amount of space actually allocated.

15. The computer program of claim 9 wherein the executable instructions further comprise instructions that cause the computer to store the value in less than all of the space allocated for the instance of the decimal type field in the row.

16. A database system including:

a massively parallel processing system including one or more nodes;

a plurality of CPUs, each of the one or more nodes providing access to one or more CPUs;

a plurality of data storage facilities each of the one or more CPUs providing access to one or more data storage facilities;

one or more tables, each of the one or more tables being stored on one or more of the data storage facilities, each of the one or more tables including a plurality of rows, each of the plurality of rows including an instance of a decimal type field;

a process for compressing the decimal type field, the process including:

for each of the plurality of rows:

allocating space in one of P amounts to an instance of the decimal type field in a row, the amount being chosen based on the size of a value being stored in the instance of the decimal type field, where the amount of allocated space is different for one or more of the plurality of rows than it is for one or more others of the plurality of rows, and where P is a predetermined positive integer greater than 1 representing the number of allocated space amounts allowed to be allocated for each row;

setting one or more presence bits in the row to identify the amount of space allocated; and storing the value in the space allocated for the instance of the decimal type field in the row.

17. The database system of claim 16 wherein each of the one or more rows includes a row header and setting the one or more presence bits comprises setting the one or more presence bits in the row header of the row to identify the amount of space allocated.

18. The database system of claim 16 wherein allocating space further comprises allocating space in a second of the P amounts to a second instance of the decimal type field in a second row, the second amount being chosen based on a size of a value being stored in the second instance of the decimal type field; and setting one or more presence bits in the second row to identify the second amount of space allocated.

19. The database system of claim 16 wherein allocating space comprises allocating a number of bytes, the maximum number that could be allocated being Q, where Q is a positive multiple of two; and setting the one or more presence bits comprises setting $\log_2(Q)$ presence bits.

20. The database system of claim 19 wherein allocating space comprises allocating a number of bytes, the number being a power of two.

21. The database system of claim 16 further comprising allocating a Pmax−Palloc space in the row to another use, where Pmax is the maximum amount of space that can be allocated to an instance of the decimal type field and Palloc is the amount of space actually allocated.

22. The database system of claim 16 further comprising storing the value in less than all of the space allocated for the instance of the decimal type field in the row.

* * * * *